(12) United States Patent
Miyata et al.

(10) Patent No.: US 6,601,959 B2
(45) Date of Patent: Aug. 5, 2003

(54) PROJECTOR DEVICE WHEREIN THE INCIDENCE ANGLE OF THE ILLUMINATION LIGHT IS MADE VARIABLE DEPENDING ON WHETHER THE PROJECTOR DEVICE IS IN A USED OR UNUSED STATE

(75) Inventors: Yasuyuki Miyata, Saitama (JP); Hitoshi Shimizu, Saitama (JP)

(73) Assignee: Fuji Photo Film Co., Ltd., Saitama (JP)

( * ) Notice: Subject to any disclaimer, the term of this patent is extended or adjusted under 35 U.S.C. 154(b) by 0 days.

(21) Appl. No.: 10/156,816

(22) Filed: May 30, 2002

(65) Prior Publication Data

US 2002/0180939 A1 Dec. 5, 2002

(30) Foreign Application Priority Data

May 30, 2001 (JP) ........................................ 2001-162097

(51) Int. Cl.$^7$ ........................ G03B 21/28; G03B 21/20; G02F 1/00; F21V 21/26; G02B 5/08
(52) U.S. Cl. ............................. 353/98; 353/87; 353/99; 353/119; 348/770; 348/771; 362/269; 362/275; 362/458; 359/850
(58) Field of Search ............................. 353/98, 99, 87, 353/119; 398/770, 771; 362/37, 269, 275, 458; 359/850

(56) References Cited

U.S. PATENT DOCUMENTS

| 6,505,939 B1 | * | 1/2003 | Bierhuizen et al. ............ 353/94 |
| 6,508,556 B1 | * | 1/2003 | Ueda ............................. 353/74 |
| 2002/0085181 A1 | * | 7/2002 | Davis et al. .................... 353/98 |

FOREIGN PATENT DOCUMENTS

| JP | 09 098442 A | 4/1997 | ............ H04N/9/31 |
| JP | 2000206452 A | 7/2002 | ............ G02B/27/18 |

\* cited by examiner

*Primary Examiner*—Russell Adams
*Assistant Examiner*—Melissa J Koval
(74) *Attorney, Agent, or Firm*—Harness, Dickey & Pierce, P.L.C.

(57) ABSTRACT

The thickness of the projector device can be reduced by making the direction of irradiation of a digital micromirror device (DMD) with illuminating light by an illuminating optical system variable depending on whether the projector device is used or not used. As an illuminating optical system is provided rotatably around an optical axis of a projecting optical system, the position of the illuminating optical system can be varied depending on whether the projector device is used or not used, and the overall thickness of the projector device can be thereby reduced.

6 Claims, 9 Drawing Sheets

PROJECTOR DEVICE WHEREIN THE INCIDENCE ANGLE OF THE ILLUMINATION LIGHT IS MADE VARIABLE DEPENDING ON WHETHER THE PROJECTOR DEVICE IS IN A USED OR UNUSED STATE

BACKGROUND OF THE INVENTION

1. Field of the Invention

The present invention relates to a projector device, and more particularly to a projector device for projecting images on a screen by using a digital micromirror device (DMD).

2. Description of the Related Art

A DMD comprises a large number of micromirrors arranged in a matrix, in which each micromirror constitutes one pixel of a displayed image. Each micromirror can take one of two inclined states, an ON state and an OFF state. In the ON state, illuminating light is reflected into a projecting optical system, while in the OFF state it is projected away from the projecting optical system. Therefore, in a projector device using a DMD, the projecting optical system projects only the light reflected by micromirrors in the ON state, resulting in the formation of a displayed image composed of a pattern of different levels of brightness on the screen.

Known projector devices using such a DMD include ones disclosed in Japanese Patent Application Publication Nos. 9-98442 and 12-206452.

FIG. 7 shows a plan of a micromirror drive structure in a DMD, and FIG. 8 shows the 8—8 section in FIG. 7. The drawings show expanded views of one extracted out of many micromirrors constituting the DMD, which actually is configured of a large number of micromirrors arranged in a matrix.

As illustrated in FIG. 7 and FIG. 8, a micromirror 2 of a DMD 1 can take either an ON state inclined by +10° or an OFF state inclined by −10° to the DMD surface by turning around a rotation axis ab. This rotation axis ab of the micromirror 2 is set in a direction inclined by 45° to the long or short side of the DMD 1, and illuminating light $L_o$ irradiates the surface of the DMD 1 at an incidence angle of 20° in a direction orthogonal to this rotation axis ab.

The illuminating light $L_o$ irradiating the DMD, if reflected by the micromirror 2 in the ON state, turns into a projecting light $L_1$ whose angle of reflection by the surface of the DMD 1 is 0° or, if reflected by the micromirror 2 in the OFF state, turns into projecting light $L_2$ whose angle of reflection by the surface of the DMD 1 is −40°. Only the projecting light $L_1$, which is a luminous flux reflected by the micromirror 2 in the ON state at 0° in the angle of reflection, comes incident on the projecting optical system, and a displayed image composed of a pattern of different levels of brightness is formed on the screen.

Incidentally, for a projector device using a DMD as stated above, on account of the above-described structure of the DMD 1, the illuminating optical system has to be configured to meet two constraints that the illuminating light $L_o$ should be brought to incidence in a direction orthogonal to the rotation axis of the micromirror 2 (a direction inclined by 45° to the long or short side of the DMD) and the illuminating light $L_o$ should further be brought to incidence at an angle of 20° to the surface of the DMD 1.

In a projector device according to the prior art, as shown in FIG. 9 and FIG. 10, a total internal reflection prism (TIR prism) is used to irradiate the DMD with illuminating light from a light source. Thus, light emitted from a light source 3 is condensed into a rod integrator 4, guided by a first mirror 5 and a second mirror 6 to a TIR prism 7 and totally reflected by that TIR prism 7 thereby to irradiate the DMD 1 in a required direction (a direction inclined by 45° to the long or short side of the DMD 1) and at a predetermined incidence angle (20°). By causing the illuminating light irradiating the DMD 1 in this way to be reflected by the DMD 1, optical modulation is performed, and the light transmitted by the TIR prism 7 after that optical modulation is projected by a projecting optical system 8 onto a screen.

However, this projector device according to the prior art, since the illuminating light should be brought to incidence on the DMD 1 in an oblique direction as shown in FIG. 10 to meet the two constraints stated above and fixed in that state, involves the disadvantage of permitting no reduction in its overall thickness.

SUMMARY OF THE INVENTION

An object of the present invention, attempted in view of this circumstance, is to provide a projector device that permits a reduction in thickness.

In order to achieve the object stated above, the present invention is directed to a projector device in which illuminating light from a light source is guided by an illuminating optical system to a digital micromirror device and irradiates the digital micromirror device at a predetermined incidence angle and in a predetermined direction, and light modulated by the digital micromirror device is projected by a projecting optical system on a screen, wherein: the direction of irradiation of the digital micromirror device with the illuminating light by the illuminating optical system is made variable depending on whether the projector device is used or unused.

According to the invention, the irradiating direction of the DMD with the illuminating light by the illuminating optical system can be varied depending on whether the device is used or not used. Therefore, by irradiating the DMD with the illuminating light in the predetermined direction only when the projector device is used, the overall thickness of the device can be reduced when it is not used.

The present invention is also directed to a projector device in which illuminating light from a light source is guided by an illuminating optical system to a digital micromirror device and irradiates the digital micromirror device at a predetermined incidence angle and in a predetermined direction, and light modulated by the digital micromirror device is projected by a projecting optical system on a screen, wherein: the digital micromirror device is provided rotatably around a rotation axis vertical to the digital micromirror device, at least part of the illuminating optical system is provided rotatably around the rotation axis so as not to let the direction of irradiation of the digital micromirror device from the illuminating optical system vary, and when the projector device is in use the inclination of the image projected on the screen is corrected by rotating at least part of the illuminating optical system and the digital micromirror device around the rotation axis.

According to the invention, the DMD is provided rotatably around a rotation axis vertical to the DMD and at least part of the illuminating optical system is provided rotatably around the rotation axis so as not to let the direction of irradiation of the DMD from the illuminating optical system vary. When the device is in use, the inclination of the image projected on the screen is corrected by rotating at least part of the illuminating optical system and the DMD around the rotation axis. This makes it possible to configure a projector device reduced in thickness when it is not in use.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

Projector devices, which are preferred embodiments of the present invention, will be described in detail below with reference to accompanying drawings.

Figure 1A:
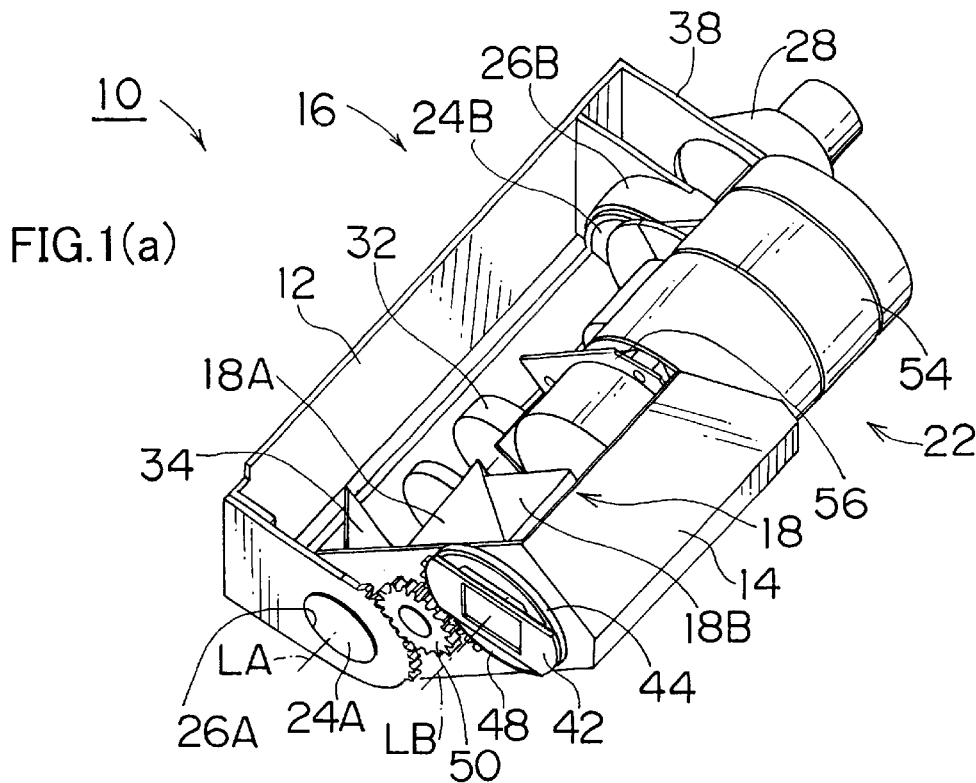
FIGS. 1(a) and 1(b) are perspective views showing the schematic configuration of a projector device, which is a first preferred embodiment of the invention.
Figure 1B:
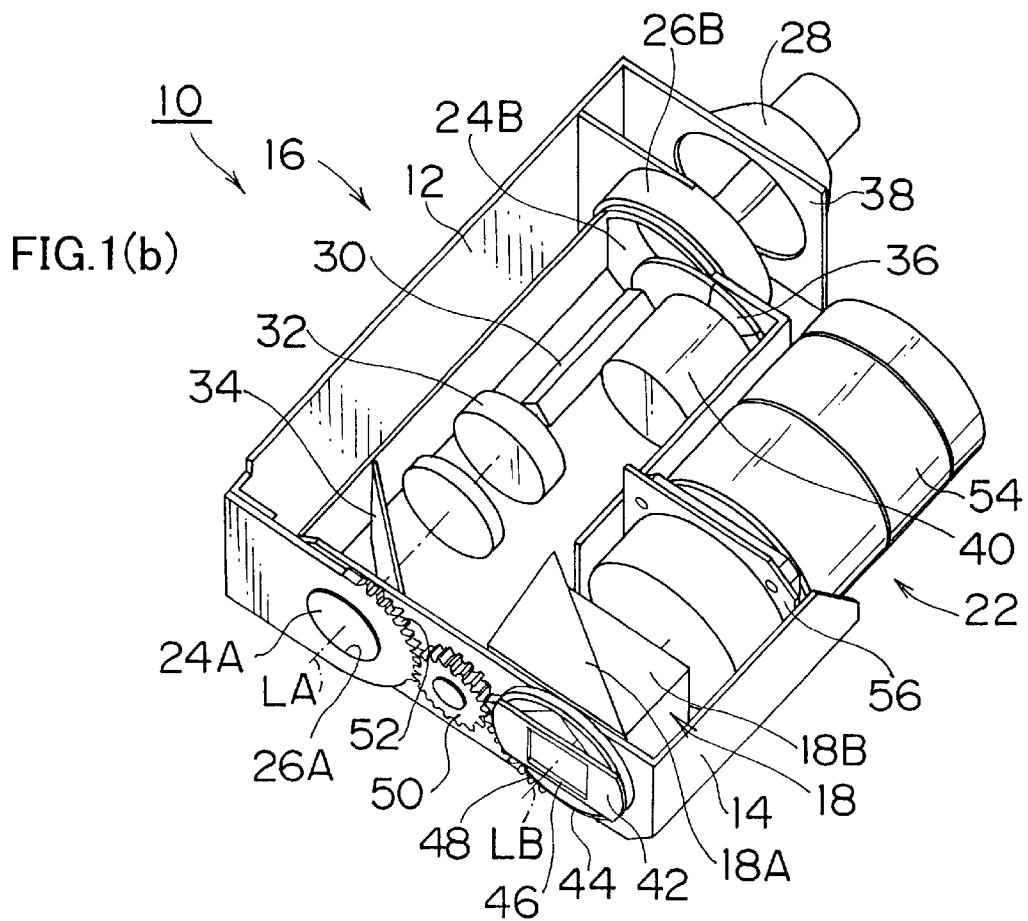
Figure 2A:
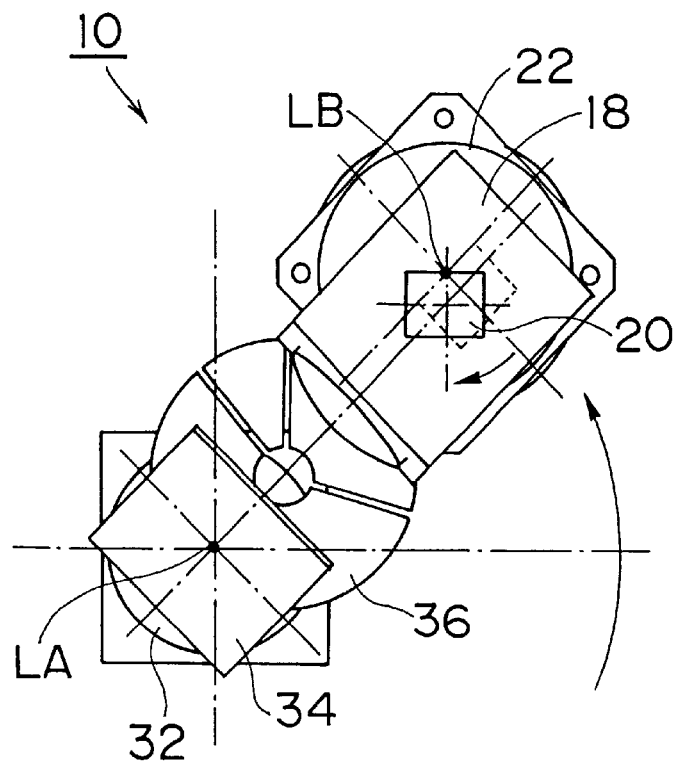
FIGS. 2(a) and 2(b) are front views showing the schematic configuration of an optical system of the projector device, which is the first preferred embodiment of the invention.
Figure 2B:
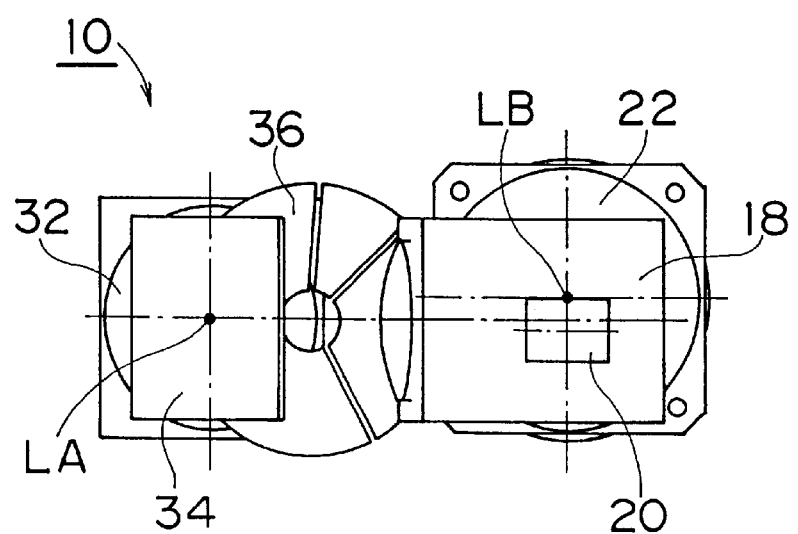
Figure 3A:
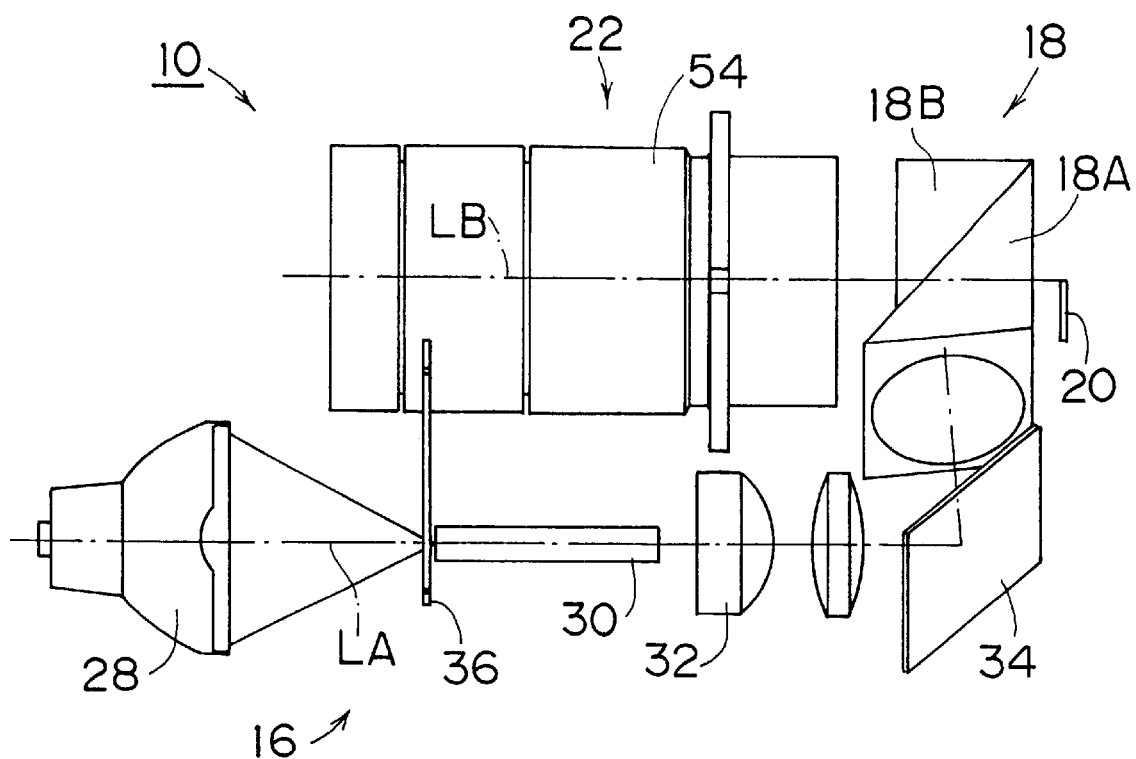
FIGS. 3(a) and 3(b) are profile view showing the schematic configuration of the optical system of the projector device, which is the first preferred embodiment of the invention.
Figure 3B:
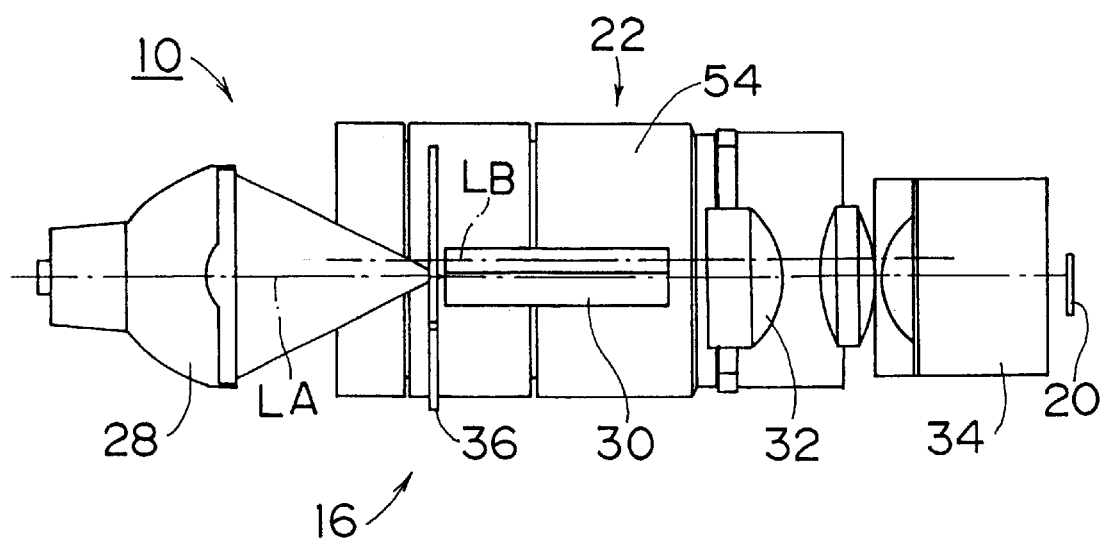
Figure 4A:
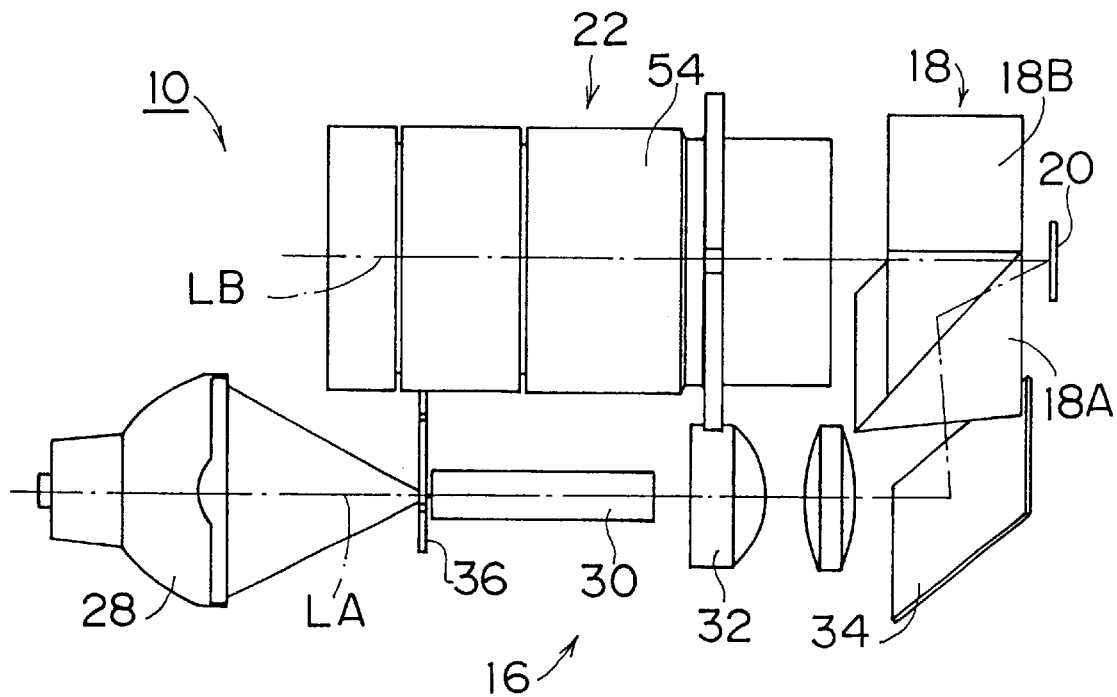
FIGS. 4(a) and 4(b) are plan views showing the schematic configuration of the optical system of the projector device, which is the first preferred embodiment of the invention.
Figure 4B:
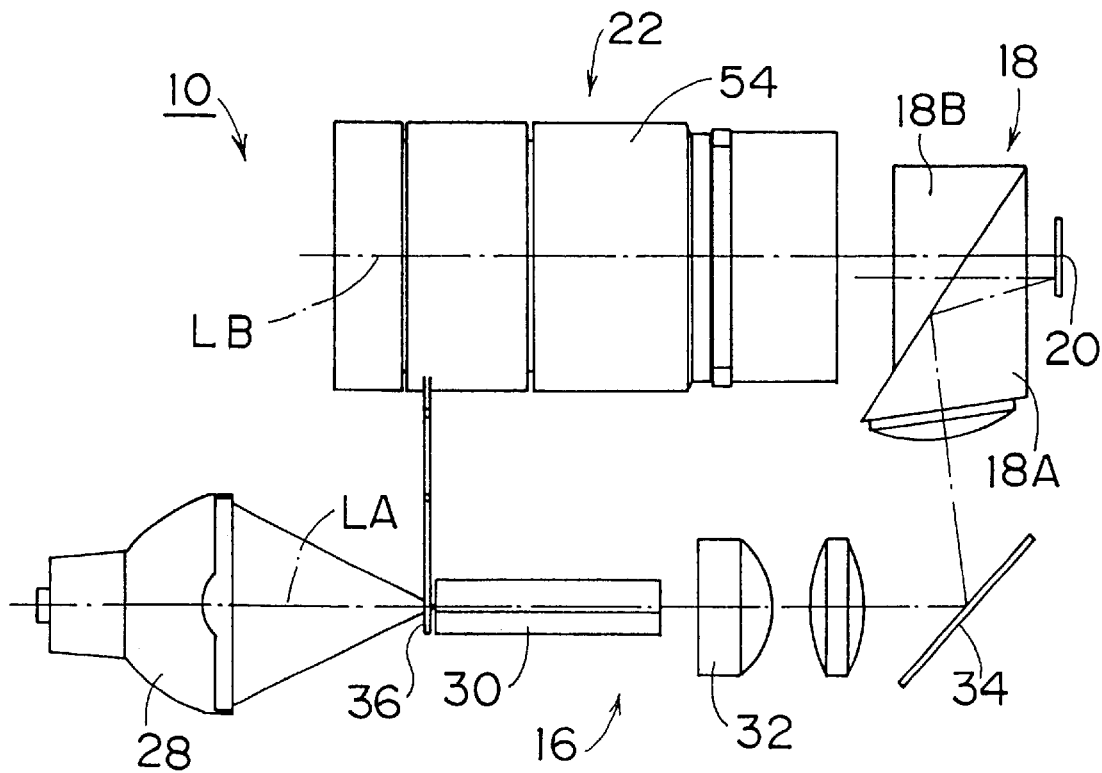

FIGS. 1(a) and 11(b) are perspective views showing the schematic configuration of a projector device, which is a first preferred embodiment of the invention. FIGS. 2(a) and 2(b) are front views, FIGS. 3(a) and 3(b) are plan views, and FIGS. 4(a) and 4(b) profile views, respectively showing the schematic configuration of its optical system. FIGS. 2(a), 3(a) and 4(a) illustrate a state in which the projector device is used, and FIGS. 2(b), 3(b) and 4(b) illustrate a state in which it is not used.

As shown in FIGS. 1(a) through 4(b), a projector device 10 according to an embodiment of the present invention comprises a fixed frame 12, a rotating frame 14, an illuminating optical system 16, a TIR prism 18, a DMD 20 and a projecting optical system 22.

The fixed frame 12 is fixed to the main frame of the projector device (not shown) with bolts or the like, and the rotating frame 14 is supported to be rotatable around an optical axis LA (the optical axis of the illuminating optical system) relative to this fixed frame 12. Thus, the rotating frame 14 is rotatably supported around the optical axis LA relative to the fixed frame 12 as a shaft part 24A formed on one of its end faces is borne by a bearing part 26A formed on the fixed frame 12 and an annual shaft part 24B formed on the other end face is borne by an annual bearing part 26B formed on the fixed frame 12. This rotating frame 14, by rotating around the optical axis LA, takes either one of two states including a state of non-use, in which it is horizontal relative to the fixed frame 12 state (the state of FIG. 1(b)) and a state of use in which it is inclined by 45° to the fixed frame 12 (the state of FIG. 1(a)). In the state of use, the rotating frame 14 is fixed to the fixed frame 12 by a stopper (not shown), and its inclined state is thereby maintained.

The illuminating optical system 16, comprising a light source 28, a rod integrator 30, a relay lens 32, a reflecting mirror 34 and a color wheel 36, guides the illuminating light emitted from the light source 28 to the TIR prism 18.

The light source 28, comprising a light source lamp and a reflector, is fitted to a light source fitting part 38 formed on the fixed frame 12.

The rod integrator 30, arranged on the optical axis LA, is fitted to the rotating frame 14 via a supporting member (not shown). The illuminating light emitted from the light source 28 is brought to incidence on this rod integrator 30, and as it is reflected within a plurality of times, is emitted as illuminating light of uniform brightness.

The relay lens 32, arranged on the optical axis LA, is fitted to the rotating frame 14 via a supporting member (not shown). The illuminating light emitted from the rod integrator 30 is condensed by this relay lens 32.

The reflecting mirror 34, arranged on the optical axis LA, is fitted to the rotating frame 14 via a supporting member (not shown). The illuminating light condensed by the relay lens 32 is brought into incidence on the TIR prism 18 by being reflected by this reflecting mirror 34.

The color wheel 36, configured by fitting filters of red (R), green (G) and blue (B) colors to a disk, is arranged between the light source 28 and the rod integrator 30. This color wheel 36, by being rotated by a motor 40, varies the color of the illuminating light coming incident on the rod integrator 30 in the sequence of R, G and B.

The TIR prism 18, arranged on the optical axis LB (the optical axis of the projecting optical system), is fitted to the rotating frame 14 via a supporting member (not shown). The TIR prism 18 is configured of a first prism 18A and a second prism 18B, and separates input light and output light from each other for the DMD 20. The first prism 18A irradiates the DMD 20 with the illuminating light in a predetermined direction at a predetermined incidence angle by totally reflecting the illuminating light emitted from the illuminating optical system 16. On the other hand, the second prism 18B transmits the light transmitted by the first prism 18A after optical modulation by the DM 20.

The DMD 20 comprises a large number of micromirrors arranged in a matrix, and displays a predetermined image as each micromirror is subjected to ON/OFF control. This DMD 20 is arranged vertically to an optical axis LB, and fitted to a rotating ring 44 via a holding plate 42. The rotating ring 44 is rotatably supported by an annular fulcrum shaft 46 formed on an end face of the rotating frame 14, and rotates around the optical axis LB.

A gear 48 is formed in part of the outer circumference of the rotating ring 44, and is engaged with an idle gear 50 provided on the rotating frame 14. The idle gear 50 is engaged with a gear 52 formed in part of the fixed frame 12. The gear 52 is formed along an arc centering on the optical axis LA. The gears 48, 50 and 52 constitutes a planetary gear mechanism, whose action enables the DMD 20, even if the rotating frame 14 is rotated, to turn around the optical axis LA with its state being kept as is. Thus, the DMD 20 rotates around the optical axis LA while keeping the state in which its long side is horizontal.

The projecting optical system 22 is configured of a plurality of lens groups accommodated and arranged in a lens tube 54, and is provided with a focusing function for focusing the image to be projected. This projecting optical system 22 is arranged on the optical axis LB, and is fitted to a supporting member 56 formed on the rotating frame 14. The projecting light having passed the TIR prism 18, after having undergone optical modulation by the DMD 20, is enlarged by this projecting optical system 22 and projected on a screen (not shown).

The projector device 10 embodying the invention as described above operates as follows.

The projector device 10 in this mode of implementation takes one of two available forms depending on whether the device is used or not used. Thus, when it is used, the device takes on a state in which the rotating frame 14 is inclined by 45° relative to the fixed frame 12 (used state) as shown in FIGS. 1(a), 2(a), 3(a) and 4(a), and, when it is not used, the rotating frame 14 is laid horizontally relative to the fixed frame 12 (unused state) as shown in FIGS. 1(b), 2(b), 3(b) and 4(b).

As the rotating frame 14 is rotated now, the DMD 20 to which the rotating frame 14 is fitted also turns around the optical axis LA. The DMD 20, with its posture kept unchanged by the planetary gear mechanism (gears 48, 50 and 52), rotates around the optical axis LA. Thus, with its long side maintained in a horizontal state, the DMD 20 turns around the optical axis LA (orbital motion).

On the other hand, the TIR prism 18 for irradiating this DMD 20 with the illuminating light, because it is fixed to the rotating frame 14, turns together with the rotating frame 14 around the optical axis LA when that rotating frame 14 rotates.

As a result, the TIR prism 18 rotates relative to the DMD 20 around the optical axis LB, and this varies the incidence direction of the illuminating light irradiating the DMD 20. Then, the TIR prism 18, when the rotating frame 14 is inclined by 45° relative to the fixed frame 12 to bring the device into a used state, it becomes possible for the illuminating light to irradiate the DMD 20 in a predetermined direction (the direction at an angle of 45° to the long side of the DMD 20) and at a predetermined incidence angle (20°). Thus, it becomes possible to irradiate the surface of the DMD 20 with the illuminating light in the direction inclined by 45° to the long side of the DMD 20 at an incidence angle of 20°. This enables a desired image to be projected on the screen.

Thus, in the projector device 10 in this mode of implementing the invention, the rotating frame 14 is inclined relative to the fixed frame 12 only when the device is used. When the light source 28 is turned on in this state in which the rotating frame 14 is inclined, the illuminating light emitted from the light source 28 is brought to incidence on the rod integrator 30 via the color wheel 36, and guided to the TIR prism 18 via the relay lens 32 and the reflecting mirror 34. Then, the illuminating light, after being totally reflected by the TIR prism 18, irradiates the DMD 20 in a predetermined direction (the direction at an angle of 45° to the long side of the DMD 20) at a predetermined incidence angle (20°). The DMD 20 reflects only the required part of light for a predetermined image to the projecting optical system 22, and the resultant projecting light is enlarged by the projecting optical system 22 and projected on the screen (not shown).

As described above, the projector device 10 in this mode of implementation can be configured in a compact way when it is not used, because it can take either of two available states depending on whether the device is used or not used.

Furthermore, as the device can be configured of a smaller number of reflecting mirrors than any conventional projector device whose optical system is fixed, the configuration of the optical system itself can be simplified, too.

Although in this embodiment of the invention the optical axis LB and the DMD 20 are rotated around the optical axis LA with the posture of the DMD 20 maintained as it is, the same purpose can as well be attained by keeping the DMD 20 fixed and turning the optical axis LA around the optical axis LB.

Further, though in this embodiment the optical axis LA of the illuminating optical system 16 is oriented parallel to the optical axis LB of the projecting optical system 22 by using the reflecting mirror 34, the optical axis of the illuminating optical system 16 may as well be orthogonal to the optical axis LB of the projecting optical system 22. The parallel orientation of the optical axis LA of the illuminating optical system 16 to the optical axis LB of the projecting optical system 22 by using the reflecting mirror 34 makes it possible to reduce the width of the projector device.

Figure 5A:
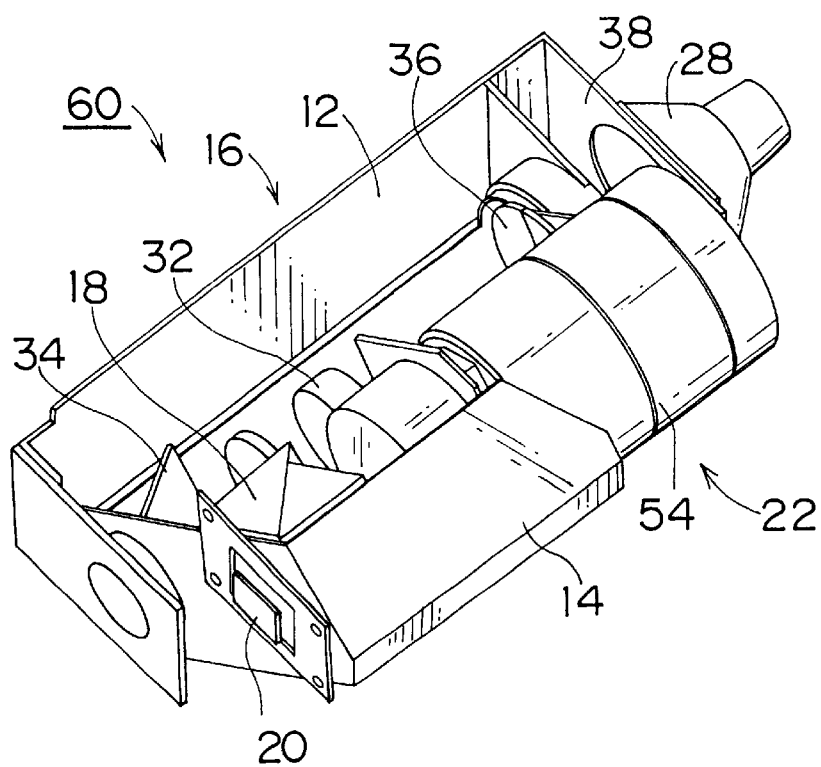
FIGS. 5(a) and 5(b) are perspective views showing the schematic configuration of a projector device, which is a second preferred embodiment of the invention.
Figure 5B:
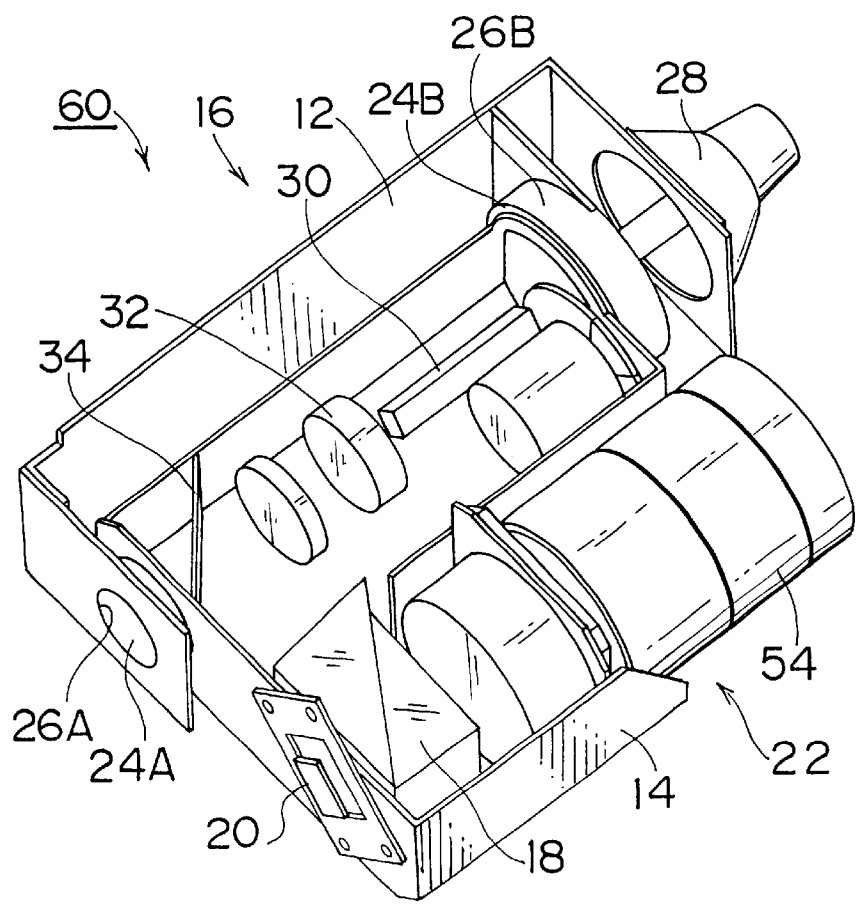
Figure 6A:
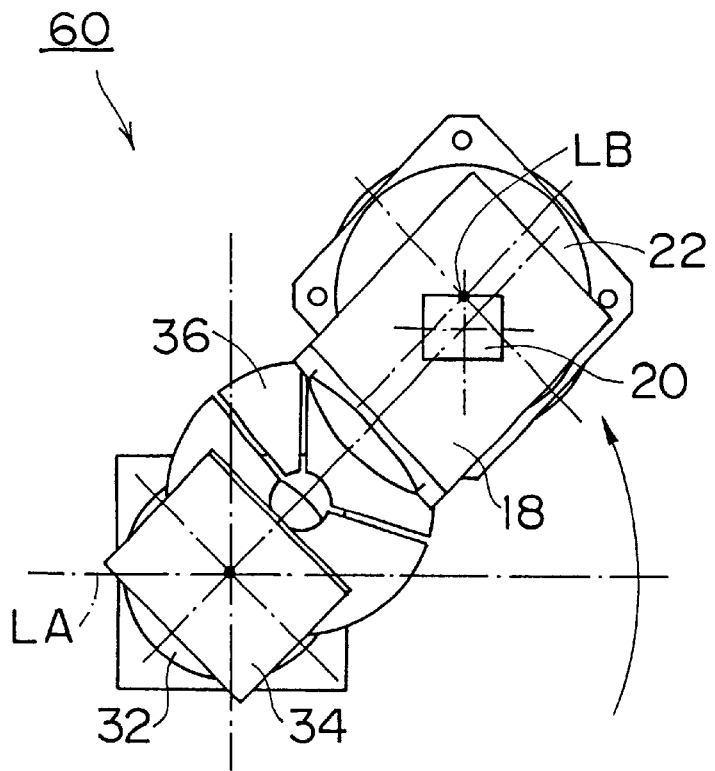
FIGS. 6(a) and 6(b) are front views showing the schematic configuration of an optical system of the projector device, which is the second preferred embodiment of the invention.
Figure 6B:
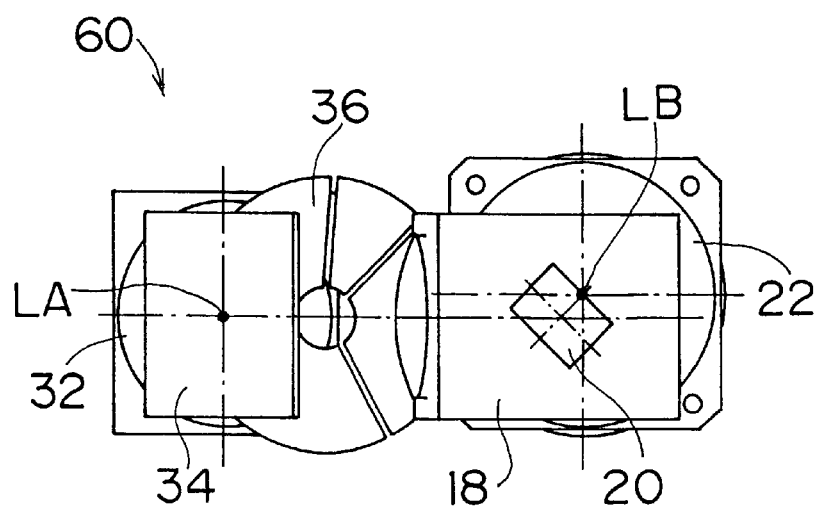
Figure 7:
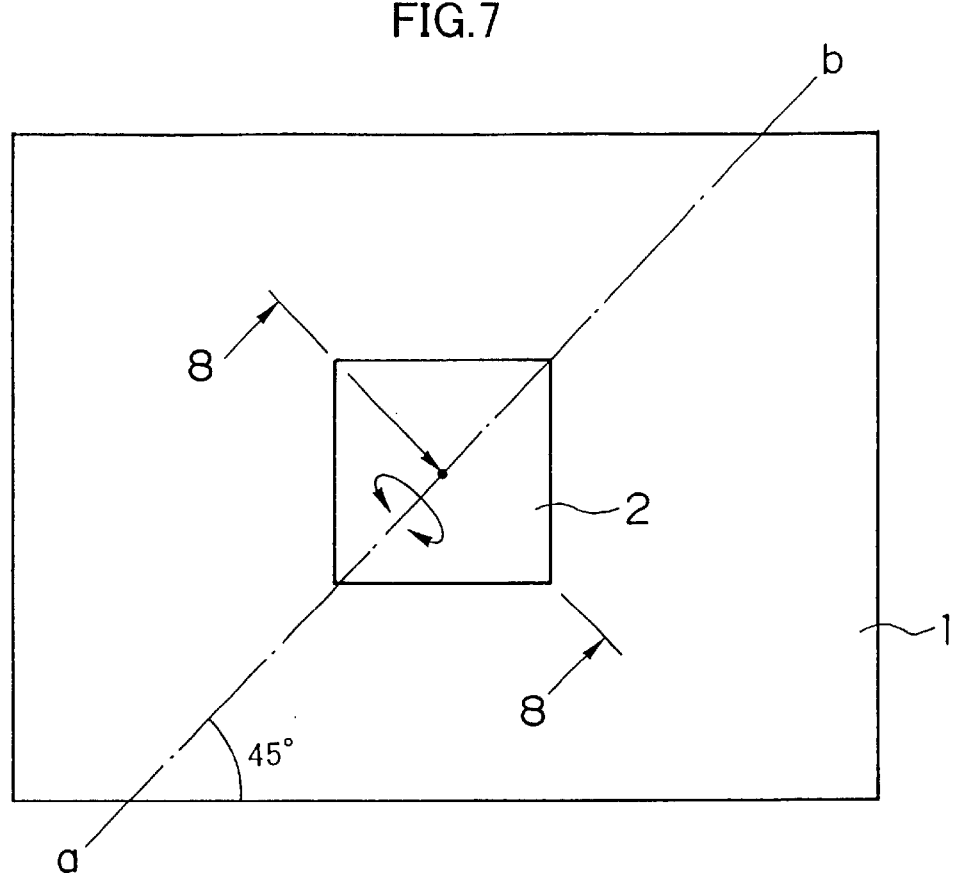
FIG. 7 shows a plan of a micromirror drive structure in a DMD.
Figure 8:
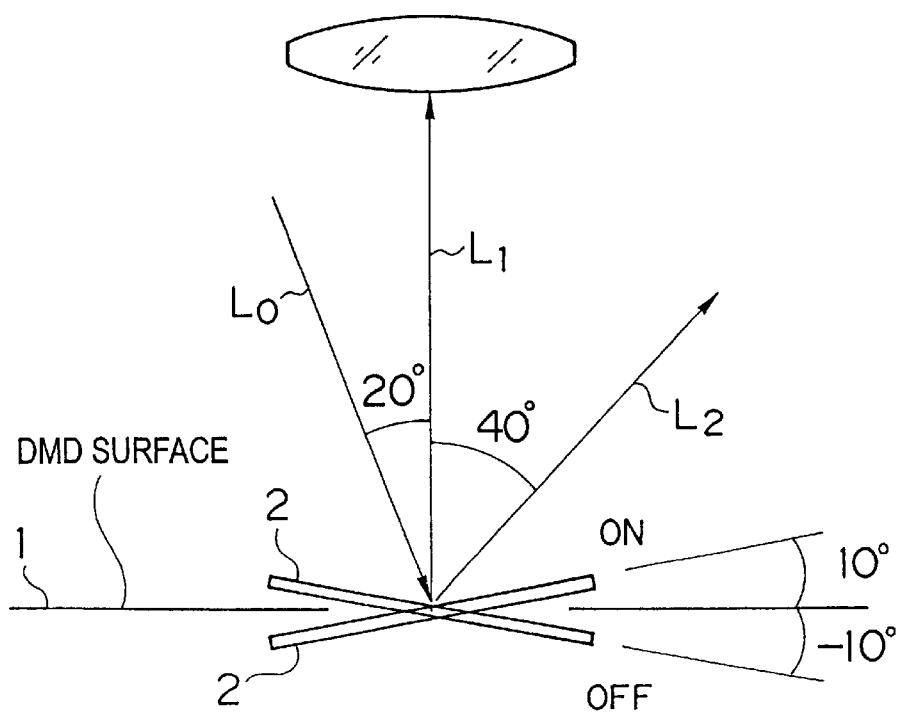
FIG. 8 shows the 8—8 section in FIG. 7.
Figure 9:
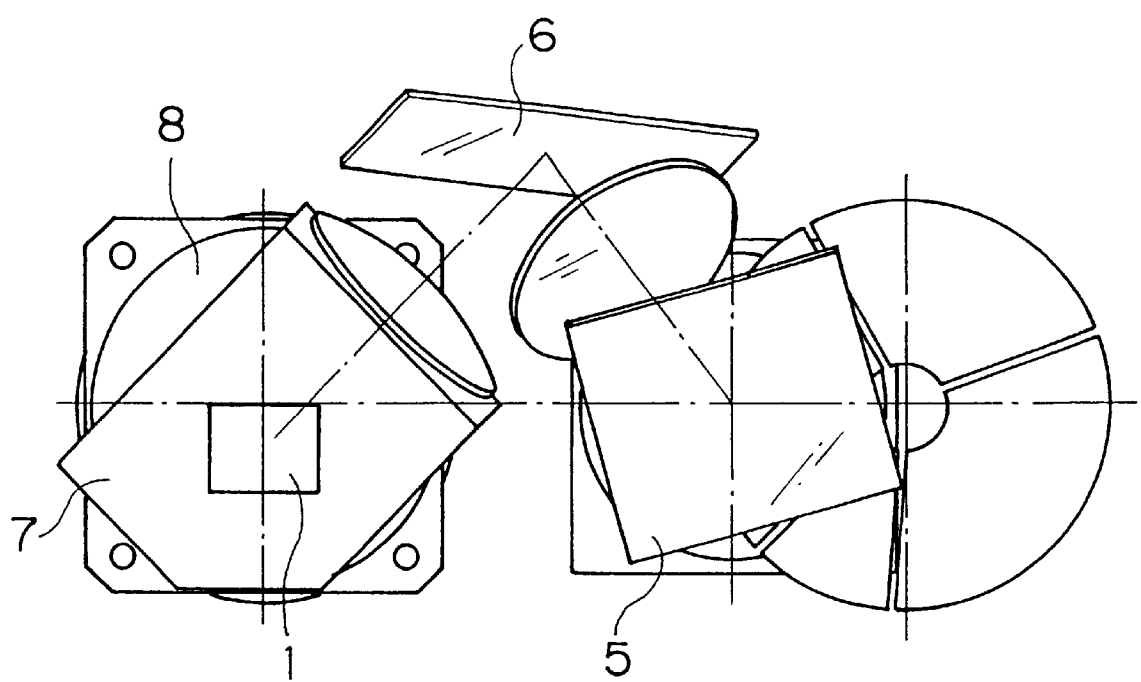
FIG. 9 is a front view showing the configuration of an optical system of a projector device according to the prior art.
Figure 10:
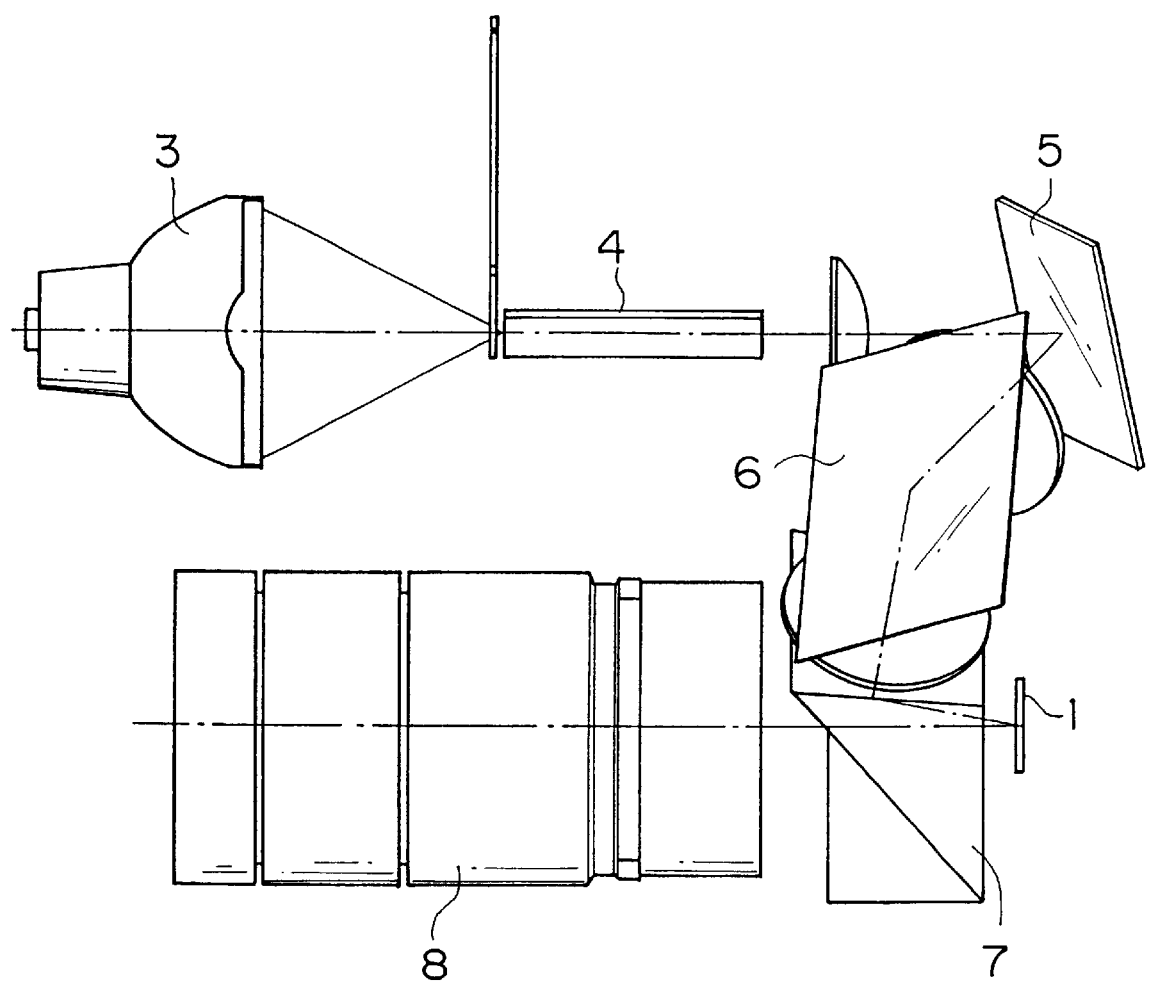
FIG. 10 is a plan showing the configuration of the optical system of the projector device according to the prior art.

FIGS. 5(a) and 5(b) are perspective views showing the schematic configuration of a projector device, which is a second preferred embodiment of the invention. FIGS. 6(a) and 6(b) are front views showing the configuration of its optical system. FIGS. 5(a) and 6(a) illustrate a state in which the projector device is used, and FIGS. 5(b) and 6(b) illustrate a state in which it is not used. The same members as in the above-described projector device 10 in the first mode of implementing the invention are assigned respectively the same reference signs.

As shown in FIGS. 5(a) through 6(b), in a projector device 60 in this embodiment, the DMD 20 is fixed to the rotating frame 14. This DMD 20 is fixed to the rotating frame 14 in advance at such an angle that illuminating light emitted from the TIR prism 18 come incident in a predetermined direction (the direction at an angle of 45° to the long side of the DMD 20) a predetermined incidence angle (20°). Thus, the DMD 20 is fixed to the rotating frame 14 in advance at a prescribe angle to the optical axis LB so that the illuminating light emitted from the TIR prism 18 irradiate the surface of the DMD 20 in a direction inclined by 45° relative to the long side of the DMD 20 at an incidence angle of 20°. The long side of this DMD 20 takes on a horizontal state relative to its installation plane when the rotating frame 14 is rotated to an angle of 45° to the fixed frame 12.

The projector device 60 embodying the invention as described above operates as follows.

The projector device 60 in this mode of implementation, like the first embodiment of the invention described earlier, takes one of two available forms depending on whether the device is used or not used. Thus, when it is used, the device takes on a state in which the rotating frame 14 is inclined by 45° relative to the fixed frame 12 (used state) as shown in FIGS. 5(a) and 6(a), and, when it is not used, the rotating frame 14 is laid horizontally relative to the fixed frame 12 (unused state) as shown in FIGS. 5(b) and 6(b).

In the projector device 60 in this mode of implementation here, since the DMD 20 is installed in advance in such a manner that the illuminating light emitted from the TIR prism 18 come incident in a predetermined direction at a predetermined incidence angle, an image can be projected on a screen even in the unused state. However, as the DMD 20 is inclined in the unused state, the image projected on the screen is also inclined.

In view of this problem, the inclination of the image projected on the screen is corrected by appropriately rotating the rotating frame 14. If the rotating frame 14 here is inclined by 45° relative to the fixed frame 12 to bring the projector device into the used state, the long side of the DMD 20 will become horizontal. Accordingly, the image projected on the screen is cleared of the inclination.

As described above, the projector device 60 in this mode of implementation can be configured in a compact way when it is not used, because it can take either of two available states depending on whether the device is used or not used.

Furthermore, as the device can be configured of a smaller number of reflecting mirrors than any conventional projector device whose optical system is fixed, the configuration of the optical system itself can be simplified, too.

Although in this embodiment of the invention the whole optical system including the DMD 20 is rotated around the optical axis LA, the same purpose can as well be attained by rotating it around the optical axis LB. Thus, if the configuration is such that the whole optical system including the DMD 20 is rotated around a rotation axis vertical to the DMD 20, the same purpose can be attained.

Further, though in this embodiment the optical axis LA of the illuminating optical system 16 is oriented parallel to the optical axis LB of the projecting optical system 22 by using the reflecting mirror 34, the optical axis of the illuminating optical system 16 may as well be orthogonal to the optical axis LB of the projecting optical system 22. The parallel orientation of the optical axis LA of the illuminating optical system 16 to the optical axis LB of the projecting optical system 22 by using the reflecting mirror 34 also makes it possible to reduce the width of the projector device.

As hitherto described, according to the present invention, the configuration of the projector device can be made more compact when it is not used by altering the arrangement of the illuminating optical system or the projecting optical system depending on whether the device is used or not used.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A projector device in which illuminating light from a light source is guided by an illuminating optical system to a digital micromirror device and irradiates the digital micromirror device at a predetermined incidence angle and in a predetermined direction, and light modulated by the digital micromirror device is projected by a projecting optical system on a screen, wherein:

the direction of irradiation of the digital micromirror device with the illuminating light by the illuminating optical system is made variable depending on whether the projector device is used or unused.

2. The projector device as set forth in claim 1, wherein the illuminating optical system and the digital micromirror device are arranged in an unused state so that the direction of irradiation of the digital micromirror device by the illuminating optical system is substantially horizontal relative to an installation plane of the projector device.

3. The projector device as set forth in claim 1, wherein the direction of irradiation of the digital micromirror device with the illuminating light by the illuminating optical system is varied as the illuminating optical system rotates around an optical axis of the projecting optical system.

4. The projector device as set forth in claim 3, wherein the illuminating optical system and the digital micromirror device are arranged in an unused state so that the direction of irradiation of the digital micromirror device by the illuminating optical system is substantially horizontal relative to an installation plane of the projector device.

5. A projector device in which illuminating light from a light source is guided by an illuminating optical system to a digital micromirror device and irradiates the digital micromirror device at a predetermined incidence angle and in a predetermined direction, and light modulated by the digital micromirror device is projected by a projecting optical system on a screen, wherein:

the digital micromirror device is provided rotatably around a rotation axis vertical to the digital micromirror device, at least part of the illuminating optical system is provided rotatably around the rotation axis so as not to let the direction of irradiation of the digital micromirror device from the illuminating optical system vary, and when the projector device is in use the inclination of the image projected on the screen is corrected by rotating at least part of the illuminating optical system and the digital micromirror device around the rotation axis.

6. The projector device as set forth in claim 5, wherein the illuminating optical system is arranged substantially horizontally when the projector device is not in use.

* * * * *

UNITED STATES PATENT AND TRADEMARK OFFICE
CERTIFICATE OF CORRECTION

PATENT NO. : 6,601,959 B2
DATED : May 30, 2002
INVENTOR(S) : Yasuyuki Miyata and Hitoshi Shimizu It is certified that error appears in the above-identified patent and that said Letters Patent is hereby corrected as shown below:

<u>Title page,</u>
Item [54], Title, should read: -- PROJECTOR DEVICE WHEREIN THE INCIDENCE ANGLE OF THE ILLUMINATION LIGHT IS MADE VARIABLE DEPENDING ON WHETHER THE PROJECTOR DEVICE IS IN A USED OR AN UNUSED STATE --
Item [73], should read:
-- [73] Assignee: Fuji Photo Optical Co., Ltd. --

Signed and Sealed this

Twenty-seventh Day of January, 2004

JON W. DUDAS
*Acting Director of the United States Patent and Trademark Office*